March 25, 1958
G. VAUX ET AL
2,827,830
MOON PROJECTOR APPARATUS
Filed July 11, 1955
2 Sheets-Sheet 1
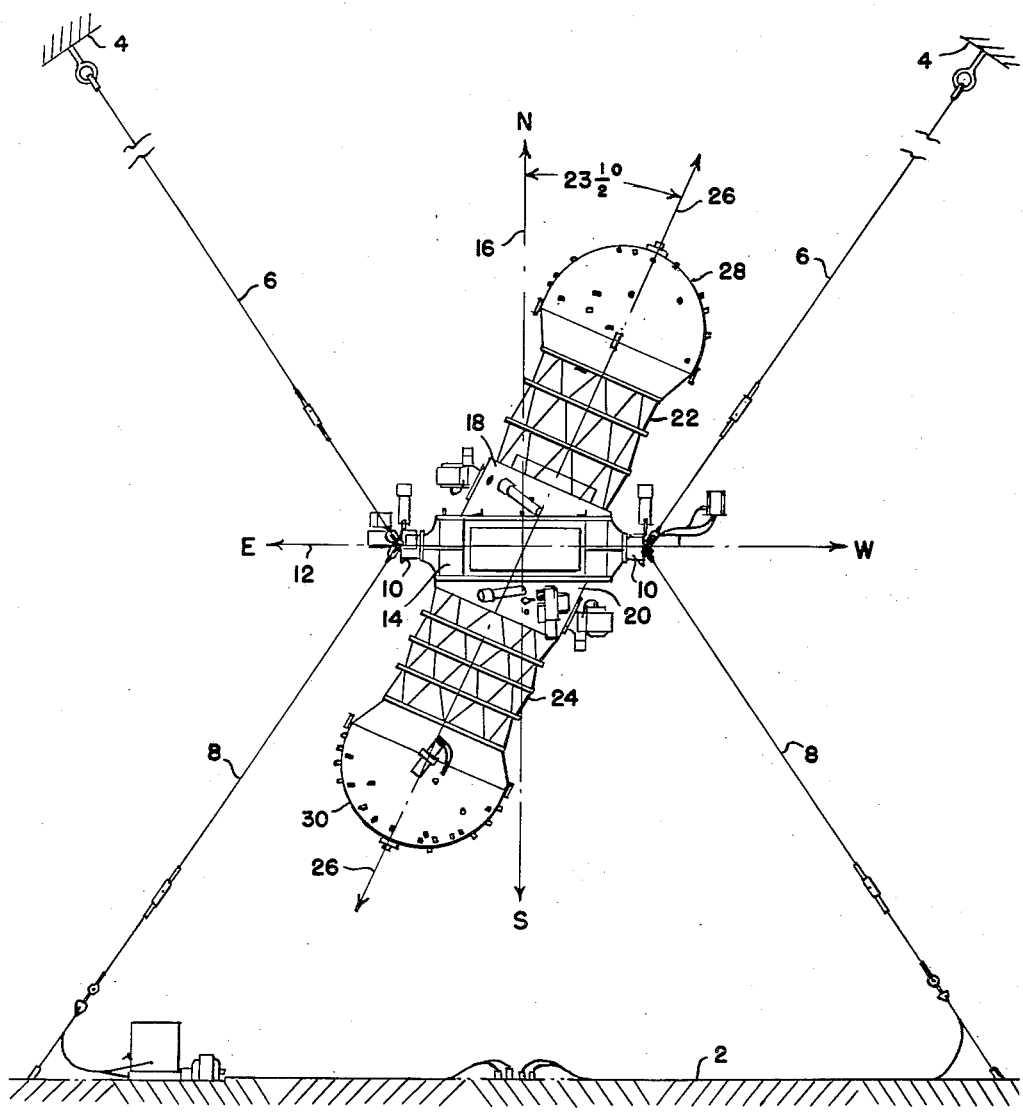
FIG. 1.
FIG. 4.
INVENTORS
GEORGE VAUX &
GILMORE L. STITELY
BY
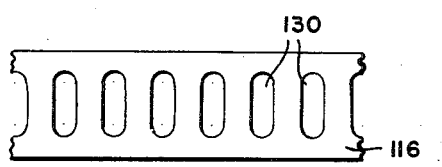
ATTORNEYS March 25, 1958 G. VAUX ET AL 2,827,830
MOON PROJECTOR APPARATUS
Filed July 11, 1955 2 Sheets-Sheet 2

INVENTORS
GEORGE VAUX &
GILMORE L. STITELY
BY
ATTORNEYS

United States Patent Office 2,827,830
Patented Mar. 25, 1958

2,827,830

MOON PROJECTOR APPARATUS

George Vaux, Bryn Mawr, Pa., and Gilmore L. Stitely, Elkton, Md.

Application July 11, 1955, Serial No. 521,085

13 Claims. (Cl. 88—24)

This invention relates to moon projectors particularly for use in planetaria for exhibiting the phases of the moon as well as its motions.

The exhibiting of the phases of the moon is a matter of some difficulty in that, if the phases are projected utilizing a transparency of the entire visible area of the moon and cooperating occulting means to provide a showing of the boundary between the illuminated and non-illuminated areas, the occulting means becomes mechanically complex if anything like a true rendition of nature is to be secured. This is, of course, due to the fact that the boundary as projected on a viewing plane as it sweeps across the surface of the moon must change from convex to concave form with a smoothly varying change of curvature.

In accordance with the present invention a moon projector is provided which, though very simple in construction, provides a highly acceptable rendition of the moon phases even though the rendition is not truly accurate. However, as is usual in the presentation of astronomical phenomena in a planetarium, strict presentation of the phenomena to a high degree of accuracy is unnecessary, since the representations are only intended to call attention to what actually occurs and give approximate visual indication thereof. Briefly stated, in accordance with the present invention, utilization is made of the so-called barrel distortion of a badly corrected lens in projecting an image in the form of a varying light area the boundary of which approximately varies in the same fashion as the apparent variation of the boundary between the light and dark areas of the moon surface.

In accordance with the invention, furthermore, the arrangement just described is combined with motion-producing means which will cause the image of the moon on a planetarium dome to move properly with respect to the other images of heavenly bodies with the phase changes occurring in proper relationship to the moon's motion.

The objects of the invention are concerned with the attainment of the foregoing, and these as well as various objects relating to details of construction and operation will become apparent from the following description read in conjunction with the accompanying drawings, in which:

Figure 1 is an outline elevation showing a type of planetarium projector to which the invention may be applied and which is illustrative of the problems involved;

Figure 4 is a fragmentary developed view of an occulting element which is utilized to effect the appearance of varying phases in the moon image.

Figure 3:
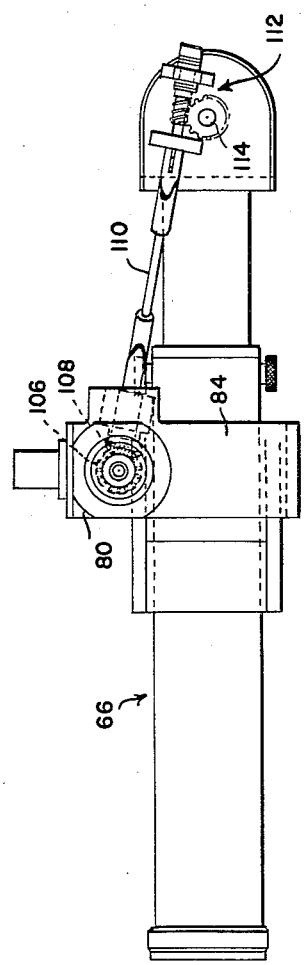
Figure 3 is a plan view of the projector proper and certain of its mounting and driving elements.

While the invention is more broadly applicable, and could, for example, be used merely to project an image of the moon surface in a fixed position while showing the variation of its phases, the projector is particularly useful in an assembly of projecting elements which will project additionally images of the sun, planets and stars and possibly other celestial markers or phenomena. To provide an understanding of the background of the particular moon projector, therefore, there is indicated in Figure 1 in outline a planetarium projector in which the moon projector is assembled and brief reference may be made to this for an understanding of the motions involved. There is indicated at 2 the floor of a planetarium and at 4 portions of the dome thereof. In the vicinity of the center of the dome, there is located a projector which is desirably mounted, as shown in Figure 1, by guy wires 6 and 8 tensioned by turnbuckles and serving to hold rigidly in position a fixed shaft the ends of which are indicated at 10. Each of the guy wires 6 and 8 illustrated is representative of a pair of guy wires diverging both in the projection illustrated and in directions normal to the plane of the figure. The projector illustrated is more fully disclosed in the application of Armand N. Spitz, Serial No. 483,547, filed January 24, 1955.

The axis 12 defined by the shaft 10 extends in an east-west direction from the standpoint of the reproduction of the star field. Mounted to rotate about the axis 12 is a casing 14. The rotation about the axis 12 provides changes in latitude of the observation. The casing 14 in turn defines an axis 16 which rotates with it about the axis 12. The axis 16 represents the axis of the earth and is correspondingly designated by the letters N and S. Diurnal rotation is accomplished about the axis 16 by providing a central assembly illustrated by the elements 18 and 20 which rotate within the casing 14 about this axis. The central assembly defines in turn an axis 26 which moves with it and corresponds to the precessional axis perpendicular to the plane of the ecliptic. The axis 26, accordingly, makes with the axis 16 an angle of approximately 23½°. Centered on the axis 26 and supported by the members 18 and 20 are cages 22 and 24 including platforms for the mounting of sun and planet projectors as well as the moon projector which will be more fully described. The sun and planet projectors are not illustrated since they are not involved in the subject matter of the invention herein claimed. For the purpose of general understanding, however, it may be remarked that they project images in directions approximately normal to the axis 26 to simulate the apparent motions of the sun and planets. Mounted at the outer ends of the cages 22 and 24 are hemispherical globes 28 and 30 which provide for the projection of the start images. These globes rotate about the axis 26 to illustrate precessional motion. It will be understood that in the complete planetarium all of the motions above mentioned are provided by motors under suitable controls. The Spitz application referred to above particularly describes details of the star projectors and the occulting means used therewith.

Figure 2:
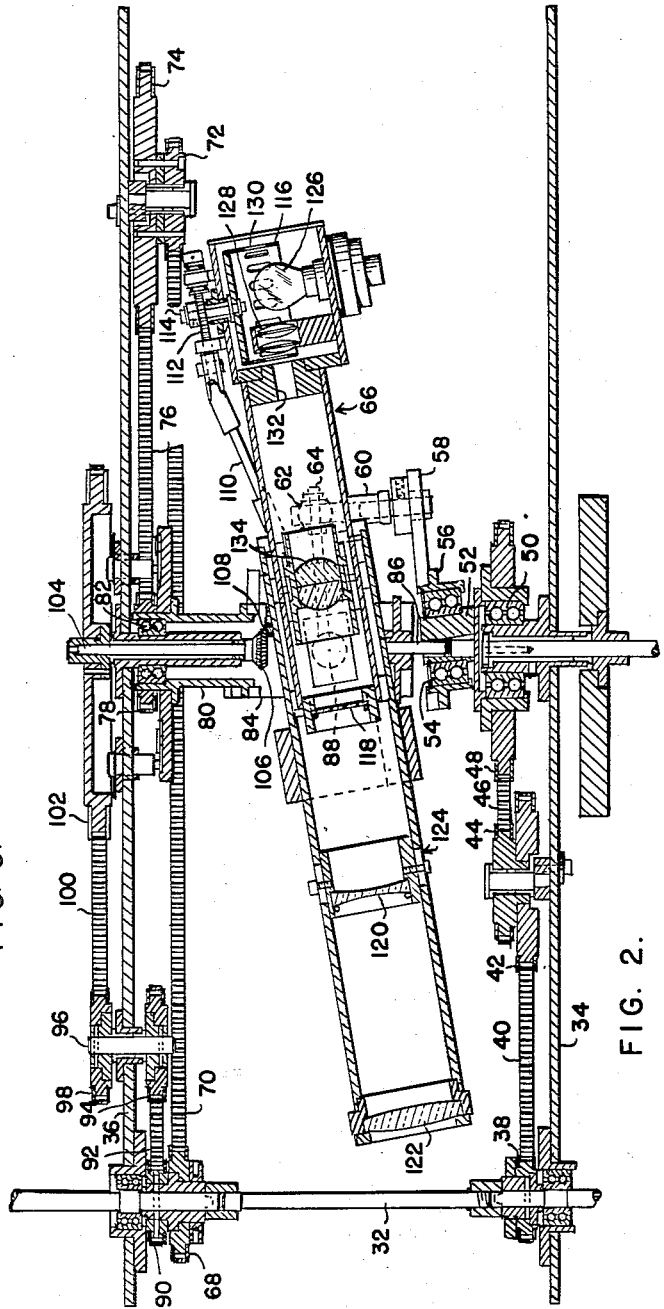
Figure 2 is a sectional view showing, in particular, the optical elements in the moon projector and the driving means therefor to secure its motions.

For the matter of the present invention, reference may now be made particularly to Figures 2 and 3. Extending parallel to the axis 26 within the upper cage 22 there is a drive shaft 32 driven at a suitable speed from mechanism located within the central portion of the projector, and from this shaft motions are taken to drive the projectors of images of the sun and various planets as well as the moon projector which is herein disclosed. Desirably, for silence and smooth operation, various drives are provided through the use of sprockets and toothed rubber belts trained about the sprockets. With such arrangements, slippages are avoided with positive smooth drive and the attainment of various ratios by utilizing sprockets of different diameters. Drives in this fashion are provided from the shaft 32 between and associated with transverse plates 34 and 36 which serve as mountings for the operating parts. In a general way, it may be said that the moon projector is located between the plates 34 and 36, there being located below the plate 34, in a typical embodiment of the invention, a sun projector (which, however, takes no part in the matter of motions of the moon projector), and there is located above the plate 36 a projector for the planet Saturn. Conveniently, certain motions are derived for the moon projector from the mechanism driving the Saturn projector since this effects simplicity of association, but it will be evident that those parts which are involved in the drive of the Saturn projector and also of the moon projector may, if desired, be provided solely for the drive of the moon projector.

A sprocket 38 secured to shaft 32 drives through belt 40 a sprocket 42 which is mounted on a fixed pin and which is connected to a sprocket 44 which through belt 46 drives a sprocket 48 mounted on a bearing 50 which, desirably, though not necessarily, is centered about the axis 26 and supported by the plate 34. Connected to the sprocket 48 to rotate therewith is a member 52 which mounts the inner race of a bearing 54 on an axis which, with respect to the sprocket 48, is inclined to the axis 26 of that sprocket and is eccentric, as illustrated in Figure 2. The external race of the bearing 54 is secured to a member 56 provided with an arm 58 in which is mounted a post 60 which at its upper end is provided with a spherical socket embracing a ball 62 having a central bore receiving a rod 64 secured to a projection tube 66 which, as will hereafter appear, is mounted for tilting movement about an axis perpendicular to the plane of the figure, the rod 64 extending normal to this axis.

A second sprocket 68 secured to shaft 32 drives through belt 70 a sprocket 72, shown displaced in Figure 2 for convenience, since the belt 70 actually passes to one side of the central mechanism hereafter described. The sprocket 72 is mounted on a fixed pin and has secured to it a second sprocket 74 which, through belt 76, drives a sprocket 78 secured to a mounting member 80 supported on a bearing 82 which has its axis coincident with the axis of bearing 50, preferably the axis 26. The member 80 is provided with a yoke portion 84 at one side of its axis (see Figure 3) and the tube 66 has trunnions 88 mounted in this yoke, one of these trunnions being connected to the rod 64.

Another sprocket 90 secured to shaft 32 drives through belt 92 a sprocket 94 secured to a shaft 96 which has a bearing in the plate 36 and has secured to it a sprocket 98 which through belt 100 drives a sprocket 102 which in the typical arrangement mentioned above may serve in part for the drive of the Saturn projector. The sprocket 102 is secured to a shaft 104 mounted concentrically with the axis of bearing 82 and carrying at its lower end a bevel pinion 106 meshing with a bevel pinion 108 carried by a shaft mounted in the yoke 84, which shaft through a universal joint arrangement indicated at 110 drives the worm of a worm and wheel arrangement 112 mounted at the right-hand end of tube 66, the shaft to which the wheel 112 is secured, shown at 114, supporting an occulting cylinder 116 to which further reference will be made hereafter.

The tube 66, which is made of a number of composite parts providing various adjustments for proper focusing, mounts a transparency 118 which carries an image of the visible face of the moon. An image of this transparency, when illuminated, is projected on the planetarium dome by the projection lens system comprising the negative lens 120 and the positive lens 122, the former lens being adjustably mounted for focusing by the screw and slot arrangement indicated at 124. The negative lens is included in this projection arrangement merely to cut down on the length of the tube which would otherwise be necessary to secure proper projection consistent with the other dimensions of the apparatus involved.

At the right-hand end of the tube 66 there is mounted a lamp 126 in association with a condenser lens system 128 which is located within the cylinder 116 previously referred to. The cylinder 116 is provided, as most clearly shown in Figure 4, with a series of elongated apertures indicated at 130. In operation, these apertures pass by rotation the fixed aperture 132. Between the aperture 132 and the transparency 118 there is located the lens 134 comprising two similar elements with plane faces cemented together and providing outer convex surfaces which, as will be noted from Figure 2, have relatively small radii of curvature so that the composite lens approximates a single sphere. As will appear later, this lens provides a very high degree of barrel distortion which is utilized in the present system.

Setting aside for the present of the phase-producing devices, the motions which are imparted to the tube 66 provide for the proper motion of the image of the moon projected on the planetarium dome with respect to the projections of the other images. It is believed unnecessary to describe in detail the ratios involved since these are chosen in obvious fashion in dependence upon the speed of shaft 32 and the drives of other elements of the planetarium projector to secure the proper motions of the moon image. The rotation imparted to the member 80 in combination with the tilting of the tube effected through the connections including the arm 58 as rotation thereof occurs about the member 52 serve to cause the moon to take the proper path through the star field. In particular, the rotation imparted to the member 52 provides the proper motion which attends the regression of the moon nodes. This involves a change of the phasing of the tilt of the tube 66 by the action of the arm 58 and its connections. It may also be remarked that in the settings of the parts there is taken into account the parallax arising from the fact that the moon projector is not concentric with the dome 4. The diameter of the dome, of course, enters into this particular adjustment.

Considering how the matter of varying the phases of the moon, the lens 134 projects on the transparency 118 images of the edges of the apertures 130 in the cylinder 116. The lens 134 provides a highly distorted image of each of the straight edges of the apertures 130 and this distortion is of the barrel type so that the following occurs:

Assuming first that the transparency 118 is fully illuminated by reason of alignment of the center of an aperture 130 with the fixed aperture 132, as rotation of cylinder 116 proceeds, an edge of the aperture 130 will move across the aperture 132. The image of this edge will first appear on the transparency 118 in the form of a curved line highly convex in an outward direction. As the motion continues, this image will move inwardly toward the center of the transparency 118 with lessening of its curvature until when the edge is aligned with the axis of the projection system it will be projected as a straight line diametrically crossing the transparency. As it then moves further, the convexity of the edge increases in the opposite direction until it passes from the other side of the transparency. Occulting, of course, occurs on the one side of the edge and it will be evident that this produces an occulting of the transparency approximately resembling what is apparent in nature. Immediately following complete occultation, the next aperture will enter the field of the aperture 132 producing a similar result but with increasing area of illumination. Taking the distortion into account, the spacings of the edges of openings 130 are such that their images are spaced by the diameter of the moon transparency thereat. Aperture 132 is of such diameter that its image coincides with the moon transparency. Thus, the waning and waxing phases are produced.

The results obtained are not strictly accurate representations of the natural phenomenon, but for practical planetarium purposes they are completely satisfactory. Accordingly, the invention provides a very simple system for demonstrating the moon phases.

The drive of the cylinder 116 is at such a rate, obtained by choice of gear and pulley ratios, that the phases are timed with the moon movements. Thus, even when the projector is utilized with a star and planet projector, proper results are secured. The moon projector may, of course, be used independently in which case the cylinder 116 could be driven at any desired speed.

It will be evident that details of the invention may be changed without departing from the invention as defined in the following claims.

What is claimed is:

1. A projector adaptable for use on a planetarium apparatus for the projection of a simulation of the phases of a heavenly body comprising means providing a circular projection aperture, means for projecting an image of said projection aperture, and means providing variable illumination of said projection aperture comprising illuminating means, movable means providing an opening having at least one edge approximately normal to its direction of motion, and a lens having barrel distortion for projecting an image of said edge of said opening at the plane of said aperture said movable means being positioned between said illuminating means and said lens.

2. Apparatus according to claim 1 in which said aperture is provided with a transparency simulating the visible surface of the moon.

3. Apparatus according to claim 1 in which said movable means is in the form of a cylinder surrounding said illuminating means.

4. Apparatus according to claim 3 in which the opening of said movable means has a width substantially such that the spacing of its projected edges is equal to the diameter of said aperture.

5. Apparatus according to claim 3 in which said movable means has a plurality of openings therein.

6. Apparatus according to claim 4 in which said movable means has a plurality of openings therein.

7. Apparatus comprising the projector of claim 1 and means for driving said projector to cause said simulation to follow a path simultating that of the heavenly body.

8. Apparatus comprising the projector of claim 1 and means for driving said projector to cause said simulation to follow a path simulating that of the moon.

9. Apparatus comprising the projector of claim 2 and means for driving said projector to cause said simulation to follow a path simulating that of the moon.

10. Apparatus comprising the projector of claim 3 and means for driving said projector to cause said simulation to follow a path simulating that of the heavenly body and means for driving said movable means to provide changes of phase in correspondence with said path.

11. Aapparatus comprising the projector of claim 3 and means for driving said projector to cause said simulation to follow a path simulating that of the moon and means for driving said movable means to provide changes of phase in correspondence with said path.

12. Apparatus according to claim 10 in which the opening of said movable means has a width substantially such that the spacing of its projected edges is equal to the diameter of said aperture.

13. Apparatus according to claim 11 in which the opening of said movable means has a width substantially such that the spacing of its projected edges is equal to the diameter of said aperture.

References Cited in the file of this patent

UNITED STATES PATENTS

| | | |
|---|---|---|
| 1,608,301 | Charton | Nov. 23, 1926 |
| 1,616,736 | Bauersfeld | Feb. 8, 1927 |
| 1,693,969 | Villiger et al. | Dec. 4, 1928 |
| 2,168,799 | Korkosz et al. | Aug. 8, 1939 |
| 2,178,352 | Unglaube et al. | Oct. 31, 1939 |
| 3,632,359 | Spitz | Mar. 24, 1953 |